(No Model.)

H. B. GOODHART.
CLUTCH.

No. 551,929. Patented Dec. 24, 1895.

Witnesses

Inventor
Howard B. Goodhart.
by W. W. Finckel
his atty.

UNITED STATES PATENT OFFICE.

HOWARD B. GOODHART, OF LANCASTER, PENNSYLVANIA, ASSIGNOR TO POTTS & WEBER, OF SAME PLACE.

CLUTCH.

SPECIFICATION forming part of Letters Patent No. 551,929, dated December 24, 1895.

Application filed January 14, 1895. Serial No. 534,803. (No model.)

*To all whom it may concern:*

Be it known that I, HOWARD B. GOODHART, a citizen of the United States, residing at Lancaster, in the county of Lancaster and State of Pennsylvania, have invented a certain new and useful Improvement in Clutches, of which the following is a full, clear, and exact description.

The object of this invention is to provide a noiseless clutch for converting a reciprocating motion into a continuous rotary motion in such machines as fan-blowers, portable forges, and other machinery and apparatus where such conversion of motion is required.

The principle of my invention will be understood best by describing it in connection with a band-pulley through which rotary motion is to be transmitted to an object to be driven. The pulley is arranged to turn upon a dead spindle or shaft, and its hub is provided with an integral or rigidly-affixed ratchet-wheel, and the pawl which is designed to cooperate intermittently with this ratchet to rotate it and the pulley is pivoted upon a carrier-plate, which is also arranged loosely upon the said spindle or shaft and is vibrated back and forth by a loose connection with a rotary reciprocating spool, the said spool having an independent connection with the pawl to cause the pawl to engage the teeth of the ratchet and to be lifted out of or clear of the teeth of the ratchet, the pawl when clear of the teeth of the ratchet being held positively out of contact therewith, and thereby allowing the pulley to rotate free of it and without the clatter and noise, to say nothing of the wear, incident to those constructions where a pawl drags over the teeth of a ratchet.

Having thus stated the principle of my invention, I will proceed now to set forth the best mode in which I have contemplated applying that principle, and then will particularly point out and distinctly claim the part, improvement, or combination which I claim as my invention.

For purposes of illustration I have shown my invention in connection with a portable fan-blower; but I wish to be understood as not limiting my invention to its application to any special class of machinery.

Figure 1:
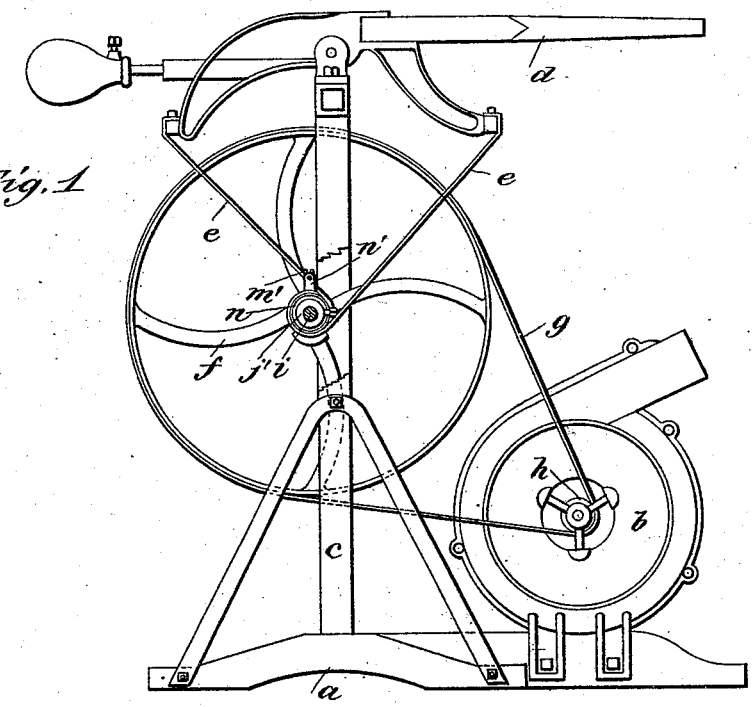
Figure 2:
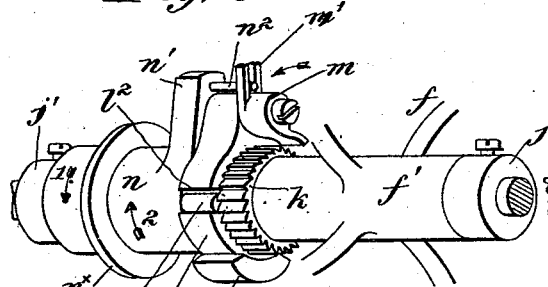
Figure 3:
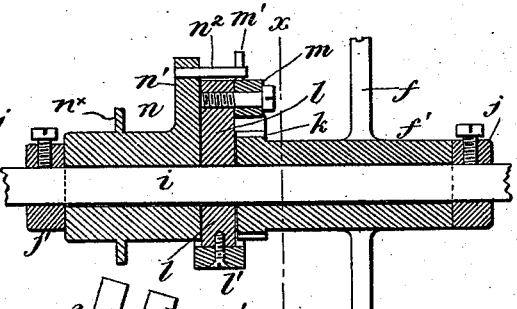
Figure 4:
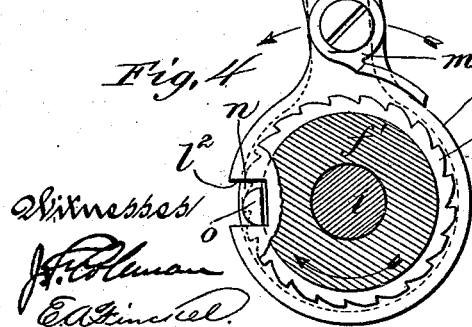
Figure 5:
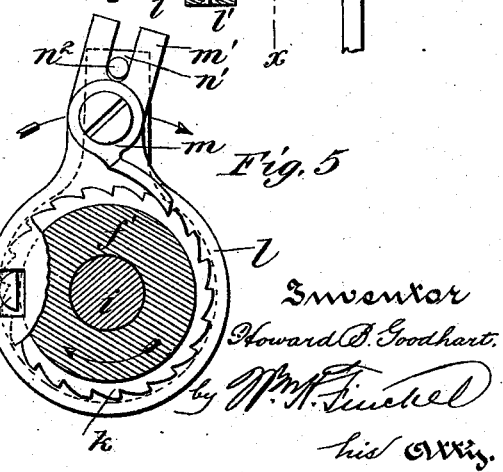

In the accompanying drawings, illustrating my invention, in the several figures of which like parts are similarly designated, Figure 1 is a side elevation of a portable fan-blower of well-known construction, the near standard or upright being broken away adjacent to the clutch. Fig. 2 is a perspective view illustrating my invention. Fig. 3 is a longitudinal section of the parts shown in Fig. 2. Fig. 4 is a sectional elevation taken in the plane of line $xx$, Fig. 3, and looking toward the left and showing the pawl out of engagement with the ratchet; and Fig. 5 is a similar view showing the pawl in engagement with the ratchet.

The base $a$, blower $b$, standards $c$, vibrating lever $d$, bands or straps $e$, the band-pulley $f$, the band $g$ and blower-pulley $h$ may be as usual, excepting that the hub of the band-pulley $f$ is modified, as hereinafter described. The dead spindle or shaft $i$ is mounted in suitable brackets on the uprights $c$, and the band-pulley $f$ turns freely upon such dead-spindle, it being adjusted upon such spindle by means of the set collars $j\ j'$. The hub $f'$ of the band-pulley is made or provided in a fixed manner with the ratchet $k$. Next to this ratchet and loosely upon the spindle $i$ is arranged the carrier-plate $l$, which, preferably, is counterweighted at $l'$ in order to insure its standing vertically. This carrier-plate has pivoted to it the pawl $m$, which is adapted to engage with and be disengaged from the teeth of the ratchet, as will presently appear. The band-spool $n$ is mounted loosely upon the spindle $i$ next the carrier-plate, and is held in place by the collar $j'$ at one end and the plate $l$, hub $f'$ and collar $j$ at the other end. As shown, this spool has a dividing-flange $n^\times$ to separate the straps $e\ e$, which straps are wound about the spool on opposite sides of the flange $n^\times$ and in opposite directions, to rotate it alternately in opposite directions.

The carrier-plate $l$ is connected with the band-spool $n$ by means of a pin $o$, which projects from one end of said spool and enters a notch $l^2$ in one edge of the said carrier. The spool $n$ is provided with an upright finger $n'$, having a pin $n^2$ engaging the forked end $m'$ of the pawl $m$.

The operation is as follows: When the stress of the lever $d$, exerted through one or the other of the bands $e$, tends to rotate the spool in the direction of arrow 1, Fig. 2, the pin $o$ of the said spool will engage the lower edge of the notch $l^2$ in the carrier-plate, as indicated in Figs. 2 and 4, and thereby rock the said carrier in the same direction, and the pin $n^2$, being also pulled in the same direction, will rock the pawl in the same direction and lift its nose from engagement with the ratchet, so that the band-pulley may rotate in one direction under acquired momentum entirely free of the pawl. Upon the reverse movement of the lever the spool will be rotated in the direction of the arrow 2, Fig. 2, and this will cause the spool to place its pin $o$ in contact with the upper edge of the notch $l^2$ and its pin $n^2$ to bear upon the other side of the forked end of the pawl and throw said pawl into engagement with the ratchet, as indicated in Fig. 5, so that upon the farther movement of the said lever in that direction an impulse will be given to the band-pulley through the action of the pawl upon the ratchet. By this construction a very simple, efficient, and durable clutch mechanism is provided, which is admirably adapted for the conversion of reciprocating or intermittent rotary motion into a continuous rotary motion.

While I have described my invention as used in connection with straps for reciprocating the spool, I wish to be understood as not limiting my invention to that method of applying rotary reciprocating motion, as it is equally common to use gearing for that purpose, such gearing ordinarily comprising a toothed segment which is adapted to engage a toothed wheel on such rotary reciprocating medium, (the spool $n$ being such medium in the instance illustrated in the drawings,) and I mean to include as within my claim both the straps and the gearing, as well as other well-known means for imparting to the device $n$ the necessary rotary reciprocating motion to actuate the pawl.

I am aware, of course, that it is not broadly new positively to lift a pawl out of engagement with its ratchet and clear of such ratchet, in order to move it back a sufficient distance to gain a fresh hold upon the ratchet; but I am not aware of any such combination as that herein set forth and hereinafter specifically claimed.

What I claim is—

The combination of a dead spindle, a driven device, such as a band pulley, arranged to revolve thereon, a ratchet fast to and turning with such driven device, the pawl-carrier $l$ also loose on such spindle and arranged next to the ratchet and provided with the notch $l^2$ in its edge, the pawl $m$ pivoted to such carrier in line with the ratchet and having the forked arm $m'$, a driving device, such as a rotary or oscillatory spool, the pin $o$ on said driving device in loose engagement with the notch in the pawl carrier, and another pin $n^2$ on said driving device engaging the forked end of the pawl, whereby as the driving device is moved in one direction its pins engage respectively the pawl-carrier and pawl to move the carrier and pawl and lift said pawl free of the ratchet and so retain it while the driving device continues so moving, and when such driving device is oppositely moved, its pins engage respectively the pawl and pawl-carrier and cause the pawl to engage the ratchet and retain it in such engagement during the continuance of such motion of the driving device, substantially as described.

In testimony whereof I have hereunto set my hand this 12th day of January, A. D. 1895.

HOWARD B. GOODHART.

Witnesses:
A. E. BURKHOLDER,
H. FRANK. ESHLEMAN.